… … …

United States Patent [19]

Leach et al.

[11] Patent Number: 4,513,047
[45] Date of Patent: Apr. 23, 1985

[54] SORBENT INTERNALLY RIBBED CARBON-CONTAINING MATERIAL AND PROTECTIVE GARMENT FABRICATED THEREFROM

[75] Inventors: Jack Leach, Greensboro; Delbert A. Davis, Kernersville, both of N.C.

[73] Assignee: Burlington Industries, Inc., Greensboro, N.C.

[21] Appl. No.: 572,751

[22] Filed: Jan. 23, 1984

[51] Int. Cl.³ .............................................. B32B 1/00
[52] U.S. Cl. .................................... 428/175; 428/181; 428/246; 428/248; 428/249; 428/252; 428/408
[58] Field of Search ............... 428/175, 181, 246, 248, 428/249, 252, 408

[56] References Cited

U.S. PATENT DOCUMENTS 3,769,144  10/1973  Economy ........................... 428/902
4,217,386  8/1980  Arons ................................ 428/408

Primary Examiner—Marion E. McCamish
Attorney, Agent, or Firm—Cushman, Darby & Cushman

[57] ABSTRACT

A material suitable for fabricating chemical warfare protective garments comprises at least one layer of an activated woven carbon fabric plus a body-side high absorbency rayon layer interposed between said at least one woven carbon fabric layer and the wearer's body. An innermost body-side layer of a ribbed fabric such as corduroy underlays the carbon and rayon layers to channel vapor away from the material. Chemical warfare protective garments having extended use life can be fabricated from this material.

12 Claims, 2 Drawing Figures

SORBENT INTERNALLY RIBBED CARBON-CONTAINING MATERIAL AND PROTECTIVE GARMENT FABRICATED THEREFROM

FIELD OF THE INVENTION

This invention relates to an internally ribbed multi-layered material containing at least one woven carbon fabric layer plus a layer of rayon to greatly increase the longevity of the material through preventing deactivation of the carbon by perspiration. The invention further relates to a chemical warfare protective garment fabricated from this material.

BACKGROUND OF THE INVENTION

It is generally known that activated carbon sorbs many different types of chemicals. This versatile material, when activated, enjoys a variety of different uses based on this single characteristic, ranging from decolorizing solutions to sorbing toxic or noxious chemicals in gas mask filter elements.

Efforts have been made to develop fabric materials which can be used to make garments that protect the wearer against chemical weapon attack —i.e. which will sorb toxic chemicals that would otherwise be harmful if allowed to contact the wearer's skin. An additional desirable feature is that the fabric be air-permeable for comfort.

For example, U.S. Pat. No. 4,217,386 to Arons et al. discloses a laminated, sorbent carbon fabric comprising a central activated carbon fabric layer, spunbonded outer non-woven layers, and intermediate melt blown non-woven layers.

U.S. Pat. No. 3,769,144 to Economy et al. discloses a quilted fabric comprising a central layer of carbon fibers between outer layers of reinforcing fabric such as an aramid material called NOMEX (trademark of E.I. DuPont de Nemours).

Perhaps the most common material used to make chemical protective garments is based on a material comprising at least one layer of polypropylene infused with roughly 30% activated carbon, overlaid with polyurethane foam to form a foam-layer composite, and then sandwiched between cover layers of suitable fabric.

Although such a material does function to sorb toxic materials while remaining relatively air permeable, it suffers from a basic defect in that its use life is only on the order of from about 4 to 8 hours. At this point perspiration can work to saturate or greatly reduce the number of active sites on the carbon so that the garment no longer serves its primary purpose. Such a garment might well be unreliable after a relatively short exposure period in a war time situation where protracted or extended exposure of the wearer to airborne toxic chemicals would be possible, yet unpredictable. Clearly what is needed is a garment fabricated from a material which will maintain its capacity to sorb for much longer than just a fraction of a day.

SUMMARY OF THE INVENTION

This invention increases the longevity of multi-layer garments containing at least one activated carbon layer by interposing, as additional layers between the activated carbon layer or layers and the skin of the wearer, (1) an absorbent rayon layer and (2) a fabric material having a plurality of ribs which form perspiration-conducting grooves or channels along the wearer's body. In so doing, the full capacity of the activated carbon layer is dedicated to sorbing airborne chemicals and toxins from the environment, rather than being deactivated by moisture, salt, or other contaminants in the wearer's perspiration.

The material comprises at least one intermediate layer of activated woven carbon fabric, a body side (i.e. between the wearer's body and the woven carbon fabric) layer of high absorbency rayon, and an innermost (i.e. closest to the wearer's skin) layer of ribbed fabric such as that commonly known to the industry as corduroy, having the channels facing inwardly toward the wearer. "Ribbed fabric" as used in the specification and claims therefore means any material having a plurality of wales on its surface. The importance of wales (i.e. ribs) will be hereinafter described. Advantageously, an exterior (i.e. away from the wearer's body) outermost layer of a fire-resistant fabric such as NOMEX (trademark of E. I. DuPont de Nemours & Co. for an aramid fiber of normal tenacity which is presently used by the military) is included as part of the material. In a preferred embodiment, the layers making up the material are flamelaminated to each other.

Thus, broadly described, this invention provides a multi-layered material suitable for fabricating chemical warfare garments, comprising at least one layer of an activated woven carbon fabric, said at least one carbon fabric layer being underlaid by a body-side rayon layer, and further underlaid by a layer of material having a plurality of ribs which form a plurality of channels. Advantageously, the material is overlaid by an exterior flame-resistant fabric layer.

It is an object of this invention to provide a material which sorbs noxious or toxic materials from the environment and which exhibits an extended use life relative to those materials presently known to the art.

It is further an object of this invention to provide a material which shows increased relative longevity in sorbing airborne environmental chemicals because it exhibits reduced tendency to be deactivated by contaminants from a wearer's perspiration.

DETAILED DESCRIPTION OF THE INVENTION

Figure 1:
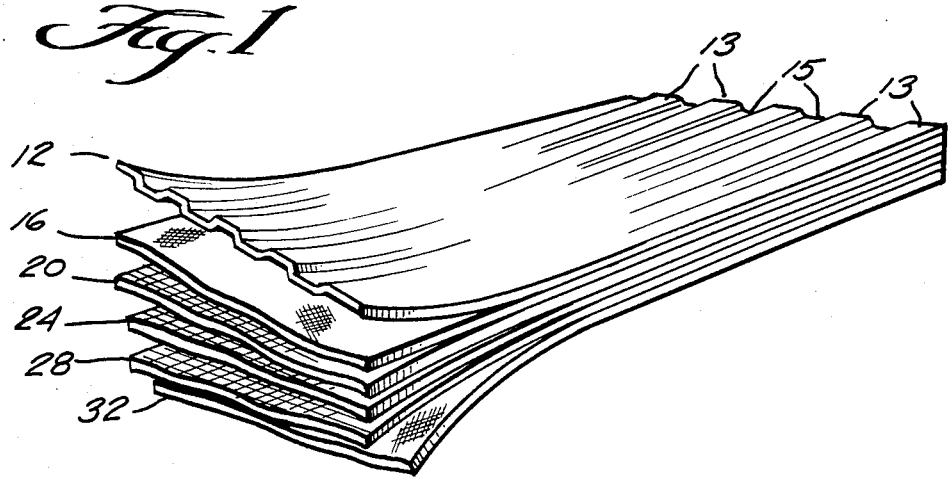
FIG. 1 illustrates a sorbent activated carbon-containing material in accordance with the present invention.

The multi-layered material of this invention can employ woven carbon fabric as known in the art. In a preferred embodiment, the woven carbon fabric is prepared from a rayon-based precursor. The process for producing rayon-based carbon yarn has been variously described in several articles and treatises, see for example *Encyclopedia of Chemical Technology*, Kirk-Othmer, 3rd Edition, Vol. 4, and need not be reviewed here. Such fabrics are commercially available, for example from manufacturers such as Burlington Industries, Inc.

Other polymers can also be carbonized and used to form layers employable as the activated carbon layer in the present invention. Such material, such as carbon fibers derived from PAN (polyacrylonitrile) or pitch, do not, however, represent preferred embodiments inasmuch as these materials are relatively brittle, but it is to be emphasized that such materials may be used in the event that carbon fibers, yarn, cloth, etc. based on a rayon precursor are not available.

The surface area of the activated carbon fibers can vary widely (the surface area of activated carbon is generally known to vary anywhere from about 300 to about 2500 $m^2/g$), the tradeoff being between potentially increased costs to produce higher surface area cloth and decreased sorption capacity available from lower surface area cloth. An additional tradeoff is also present in that higher surface area carbon fibers are generally also more highly frangible, such that a very high surface area carbon fabric may produce a material of relatively low mechanical ruggedness. Generally, it is preferred to use the highest surface area carbon cloth available consistent with cost, desired ruggedness, and the type of toxin or chemical intended to be sorbed.

The carbon fabric can be activated by methods known to the art. For example, the fabric can be steam activated at temperatures on the order of 500°–900° C.

More than one layer of activated carbon fabric can be used to make the sorbent material. Furthermore, and as will be hereinafter explained, all layers in the material are secured together as by laminating by any of several means, but it is a particularly preferred embodiment to form the multi-layered material by flame lamination.

It is particularly a goal of the invention to provide a two-pronged defense against a wearer deactivating the sorbent carbon fabric layers with his own perspiration.

The first prong is implemented by providing, as the innermost fabric layer worn closest to the wearer's skin, a fabric layer having a plurality of ribs disposed on its interior surface so that the channels formed by the ribs serve as conduits which conduct perspiration or moisture laden air along the wearer's body and vent the perspiration or air outside the protective garment. A suitable fabric having ribs is generally known and widely available under the name corduroy. The corduroy itself may be all cotton or a cotton/polyester blend. Satisfactory weight for the corduroy is any fabric weighing from about 4 to about 12 ounces per yard.

The second (backup) prong for increasing longevity of the material is to provide a moisture-absorbent barrier between the one or more layers of activated carbon fabric and the ribbed fabric layer. This is preferably done by underlaying the activated carbon fabric layers with a body-side layer of viscose rayon which acts as a very effective moisture barrier. The term "rayon" in this context has its commonly accepted meaning of a material fabricated from regenerated cellulose. Albeit other materials can be used for liners from the standpoint of comfort and light weight, the present inventors have found that viscose rayon is best at absorbing moisture, including perspiration. Consequently, it represents a preferred embodiment as a liner for protecting the layers of activated carbon from sorbing any perspiration which might otherwise penetrate the ribbed fabric and deactivate the carbon fabric. Viscose rayon fabrics suitable for use as the absorbent layer are per se commercially available under various industry names such as Avsorb (Avtex Corporation) and Absorbit (Enka Corporation).

Thus in use a garment made from the material of this invention circumvents body moisture penetration into the activated carbon layers by virtue of the ribbed fabric layer which channels the moisture outside the garment. Moisture which does penetrate the ribbed layer is absorbed by the rayon layer.

An additional layer of material may be added as an outermost layer (i.e. that layer furthest from the skin of the wearer), as mentioned, and is preferably a flame-resistant material which further increases the utility of the material in fabricating protective garments. As previously mentioned, preferred is a commercially available fire-resistant fabric called NOMEX, a trademark of E. I. du Pont de Nemours & Co.

All layers may be secured together to make the material as by any of several methods known to the art. Simply quilting or sewing the layers together is possible, although a potential drawback is fracture of the carbon fabric by the cutting needle. Preferred is the method of flame lamination wherein a layer of adhesive polymer is interposed between each of the other layers, the entire composite is heated to the point at which the adhesive layer melts at least partially and becomes sticky, and all of the surfaces thereby adhere to each other.

Two polymers which are well suited for use as such adhesives are polypropylene and polyurethane, in either granular or film form. Each of these polymers becomes quite sticky when subjected to heat either by flame or simply by radiation. The types of polyurethanes and polypropylene which are commonly used for flame lamination are well known and commercially available.

The polyurethane may be applied advantageously as a foam and then crushed. Applying the polyurethane as a foam allows the application of light, consistently deep foam layers which may then be crushed to achieve very thin adhesive layers which are nonetheless of very consistent thickness. Further, polyurethane is a very "forgiving" adhesive in that it does not, to any appreciable extent, wet (and therefore will not poison) the activated carbon layers.

Polypropylene also may be advantageously used inasmuch as it is believed to exhibit a synergistic effect with regard to enhancing the absorbency of the rayon layer while yet preventing vapor penetration from the rayon through to the carbon fabric barriers from the individual wearer's perspiration.

In addition to polypropylene, other polyolefins are available which can also serve as adhesive. Adhesives other than polyolefins can also be used (e.g. acrylic) to achieve the lamination. Whatever the adhesive used, it should be borne in mind that it should not have a high penetration into either the carbon fabric or the layer to which the carbon fabric is being adhered, lest the adhesive act as a physical blockage to gas sorption by the carbon and thereby act to reduce the sorbent capacity of the material.

Different adhesives may be used to advantage in the same multilayered material. For example, polypropylene may be used to laminate the rayon layer to the activated carbon layers to take advantage of the increased absorbency of the rayon provided by virtue of the synergy between rayon and polypropylene. At the same time, polyurethane may be used to laminate the remaining layers and by virtue of providing very thin layers, thereby provide a less bulky garment.

Any number of layers of carbon may be employed to make the material, depending upon the weight per square yard of the material and the degree of flexibility desired to make the resulting garment as comfortable as possible. As a rule of thumb, the inventors have chosen three as an optimum number in that this number of carbon layers provides a sufficient amount of carbon sorption capacity to allow for fairly lengthy exposure periods while still giving a reasonable degree of flexibility and comfort to the composite garment. Of the carbon fabrics suitable for use, those weighing between about 5 and about 12 ounces per square yard are particularly desirable as contributing to a protective yet light and comfortable garment.

Processes other than flame lamination may also be used, such as the so-called dot process, again depending upon the degree of flexibility desired.

Figure 2:
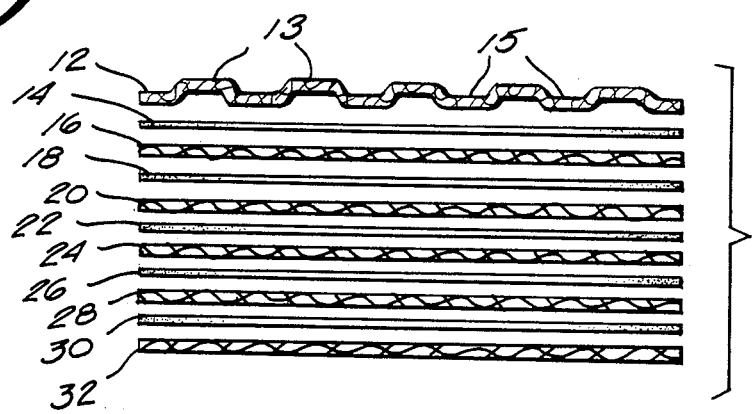
FIG. 2 is an exploded sectional view showing the individual layers in the fabric material according to the invention.

FIGS. 1 and 2 represent two illustrations of material constructed according to the invention.

FIG. 1 shows a multi-layered laminated material wherein one end of the material has been drawn fanned apart for ease of identification of the various layers. 12 is a layer of corduroy or other ribbed fabric which would be located closest to the body of the wearer in actual use. Disposed on layer 12 is a plurality of wales 13 which correspondingly form channels 15. Absorbent rayon layer 16 is between the (body side) corduroy layer and a first (exterior side) carbon fabric layer 20. Successive carbon fabric layers 24 and 28 are shown laminated with carbon fabric layer 20 to form a material having a total of three carbon fabric layers. Outermost layer 32, worn furthest from the skin of the wearer, is a NOMEX twill added, as mentioned, to provide flame-resistance to the garment. Not shown in FIG. 1 are the layers of adhesive material interposed between each of the fabric layers shown therein.

FIG. 2 shows all layers needed to make the material corresponding to the laminate of FIG. 1 and additionally shows the adhesive resin layers needed to secure the layers to each other. Thus, in addition to corduroy layer 12, rayon layer 16, carbon layers 20, 24 and 28, and NOMEX twill layer 32, adhesive resin layers 14, 18, 22, 26 and 30 are also shown. As stated before, these adhesive layers need not all be the same, but can be variously chosen depending on the overall characteristics of the desired material and end product garment.

Thus it should be apparent that the invention provides a chemical warfare protective garment having an extended use life by virtue of largely precluding deactivation of the sorbent carbon fabric layers by perspiration from the wearer himself. The garment, because a ribbed fabric is used as the innermost layer, further provides a mechanism for channeling perspiration vapor out from beneath the garment, in essence relegating the absorbent layer to use as a backup system and thereby increasing garment longevity. The material further provides flame resistance and toxic chemical sorption capability within limits dictated only by desired sorption capacity, flexibility, and weight.

Advantageously, it is believed that garments fabricated from the material will exhibit use lives on the order of 24–48 hours, a significant advance over garments presently used by the military which are also based on activated carbon.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A laminate suitable for fabricating garments, comprising:
   at least one layer of a woven activated carbon fabric;
   an absorbent body-side rayon layer which underlays said at least one carbon fabric layer; and
   an innermost layer of a fabric material having a plurality of ribs which form perspiration-conducting channels, said innermost layer underlying said body-side rayon layer.

2. The laminate of claim 1 wherein said layers 2 are laminate to each other by forming a composite by interposing an adhesive resin layer between each of said layers and flame-laminating the composite.

3. The laminate of claim 2 wherein said adhesive resin layer is polypropylene.

4. The laminate of claim 2 wherein said adhesive resin layer is polyurethane.

5. The laminate of claim 1, further comprising an outermost exterior flame-resistant layer.

6. The laminate of claim 5 wherein said flame-resistant fabric layer comprises an aramid fiber.

7. A garment fabricated from a laminate, said laminate comprising:
   at least one layer of a woven activated carbon fabric;
   an absorbent body-side rayon layer which underlays said at least one carbon fabric layer; and
   an innermost layer of a fabric material having a plurality of ribs which form perspiration-conducting channels, said innermost layer underlying said body-side rayon layer.

8. The garment of claim 7, wherein said layers are laminate to each other by forming a composite by interposing an adhesive resin layer between each of said layers and flame-laminating the composite.

9. The garment of claim 8 wherein said adhesive resin is polypropylene.

10. The garment of claim 8 wherein said adhesive resin is polyurethane.

11. The garment of claim 7, wherein said laminate further comprises an outermost exterior flame-resistant layer.

12. The garment of claim 11, wherein said flame-resistant fabric layer comprises an aramid fiber.

* * * * *